United States Patent
Chartier et al.

Patent Number: 5,502,737
Date of Patent: *Mar. 26, 1996

[54] LASER CAVITY PASSIVELY SWITCHED BY A SATURABLE ABSORBER AND LASER INCORPORATING SAID CAVITY

[75] Inventors: Isabelle Chartier, Grenoble; Bernard Ferrand, Voreppe; Denis Pelenc, Meylan; Christophe Wyon, Grenoble, all of France

[73] Assignee: Commissariat a l'Energie Atomique, Paris, France

[*] Notice: The term of this patent shall not extend beyond the expiration date of Pat. No. 5,495,494.

[21] Appl. No.: 340,296

[22] Filed: Nov. 14, 1994

[30] Foreign Application Priority Data

Nov. 15, 1993 [FR] France .................................. 93 13563

[51] Int. Cl.$^6$ .................................................. H01S 3/113
[52] U.S. Cl. ......................................................... 372/11
[58] Field of Search ................................ 372/11, 98, 10

[56] References Cited

U.S. PATENT DOCUMENTS 3,270,291  8/1966  Kosonocky .
5,278,855  1/1994  Jacobovitz-Veselka et al. ......... 372/11
5,309,471  5/1994  Chambaz et al. .

FOREIGN PATENT DOCUMENTS 1566716  5/1980  United Kingdom .

OTHER PUBLICATIONS

Optics Letters, vol. 18, No. 18, Sep. 15, 1993, pp. 1514–1516, Y. Tsou, et al., "Passive Q Switching of Nd:YAG Lasers by use of Bulk Semiconductors".

*Primary Examiner*—Rodney B. Bovernick
*Assistant Examiner*—Robert E. Wise
*Attorney, Agent, or Firm*—Oblon, Spivak, McClelland, Maier, & Neustadt

[57] ABSTRACT

A laser cavity with passive switching by a saturable absorber and a laser incorporating the cavity. The laser cavity has a solid, active material saturable absorber, an entrance mirror and an exit mirror. The saturable absorber is a thin film of saturable absorber material directly deposited on the solid, active medium. The laser incorporates such cavity and a mechanism for pumping the cavity.

18 Claims, 2 Drawing Sheets

LASER CAVITY PASSIVELY SWITCHED BY A SATURABLE ABSORBER AND LASER INCORPORATING SAID CAVITY

BACKGROUND OF THE INVENTION

1. Field of the Invention

The present invention relates to the field of switched lasers. The aim of this type of laser is to produce short duration, coherent light pulses whose emitted peak power is high compared with that used for pumping. In a standard manner there are two solutions for obtaining said switching, one is called active and the other passive, the latter being used in the present invention.

2. Discussion of the Background

More specifically, the switching of a laser cavity consists of adding therein time-variable losses, which prevent the laser effect from occurring during a certain time, during which the pumping energy is stored in the excited level of the gain material of the laser. These losses are suddenly reduced at precise times, thus releasing the stored energy in a very short time (giant pulse). Thus, high peak power is obtained.

In the case of active switching, the value of the losses is externally controlled by the user (e.g. using a rotary cavity mirror, an intercavity acousto-optical or electro-optical means changing either the path of the beam, or its polarization state). The storage time, the laser opening time and the repetition rate can be chosen independently. However, this requires adapted electronics and makes the laser system more complicated.

In the case of passive switching, variable losses are introduced into the cavity in the form of a saturable absorber or SA material, which is highly absorbent at the laser wavelength and low power density and which become substantially transparent when said density exceeds a certain threshold, which is called the saturation intensity of the SA. The enormous advantage of passive switching is that it requires no control electronics.

Known saturable absorbers often contain organic molecules which are responsible for the absorption. These materials are generally in liquid or plastic form and consequently are often of poor optical quality, which age very rapidly and have a poor resistance to the laser flux.

Solid materials are also used as saturable absorbers, e.g. for lasers emitting at around 1 μm (YAG with active ions: $Nd^{3+}$ or $Yb^{3+}$), it is possible to use:

crystals of LiF:F2 having coloured centers responsible for the SA behaviour of the material and which have a limited life, certain $Cr^{4+}$-doped solid crystals having a saturable absorption at around 1 μm.

However, for this type of solid saturable absorber, the limited absorbent ion concentration requires the use of a considerable material thickness, prevents a strong focussing of the beam and therefore increases thresholds. Moreover, it prevents applications where the source must be very compact, i.e. in the case of a microlaser with a cavity length of approximately 1 mm.

Good results have been obtained with solid crystals codoped with the active ion and the absorber ion: e.g. $Nd^{3+}$ and $Cr^{4+}$. The advantage of these self-switched laser materials is that no different material is introduced for the switching and therefore no supplementary losses are introduced. Their disadvantage is of linking the active ion concentration with that of the absorbent ion, which makes it difficult to optimize the laser, the adaptation of the laser to the available pumping power then requiring the growth of a new solid crystal.

For lasers emitting at around 1.5 μm (active ion: $Er^{3+}$), there are highly $Er^{3+}$ doped solid materials, which have a saturable absorption around 1.5 μm and which permit the switching of such lasers. However, once again the problems described hereinbefore in connection with solid materials are encountered.

In known lasers passively switched with the aid of said saturable absorbers, different switched cavity production methods exist and are dependent on the SA used:

1. A first method is illustrated in FIG. 1a, where it is possible to see the laser cavity 1, the solid, active laser material 2, the saturable absorber 3 and the cavity exit mirror 4 and entrance mirror 5. There is no contact between the saturable absorber 3 on the one hand and the other elements of the cavity 1 on the other. In this type of device, it is necessary to optically align the cavity elements.

2. In the arrangements illustrated in FIGS. 1b and 1c, a contact is ensured between the saturable absorber 3 and the mirror 4 (FIG. 1b) or the active laser material 2 (FIG. 1c) with the aid of an optical adhesive 6. However, the adhesive introduces a residual absorption factor, as well as index differences at the interface between the adhesive and the adhered materials. Moreover, a possible parallelism error between the adhered elements can also be the source of losses in the laser cavity.

3. FIG. 1d, where references 4 and 5 again designate the mirrors and reference 2 the active laser medium, illustrates a third possible arrangement, where one of the mirrors 4 is directly deposited on the saturable absorber 3. However, this is only possible when the saturable absorber can undergo a polishing operation prior to the deposition thereon of the mirror and this is not the case when it is essentially made from a glass or a crystal.

SUMMARY OF THE INVENTION

The invention relates to a novel type of laser cavity with a solid, active medium making it possible to solve the aforementioned problems. The invention also relates to a process for the production of said laser cavity, as well as to a laser incorporating the latter.

To obviate the aforementioned problems, the invention proposes producing the saturable absorber in the form of a thin film on a substrate.

The invention therefore relates to a laser cavity having a solid, active laser medium, a substrate, a saturable absorber, an entrance or input mirror and an exit or output mirror, characterized in that the saturable absorber is a thin film of saturable absorber material.

The form of the thin saturable absorber film makes it possible to overcome certain problems linked with saturable absorbers in solid form described hereinabove. It is therefore possible to minimize losses within the cavity due to the solid form of the conventional saturable absorber. It is also possible to deposit the film on substrates having different shapes and dimensions. Finally, it is clear that said structure makes it possible to attain a space gain within the laser cavity.

Preferably, said laser cavity has a thin film which can be obtained by liquid phase epitaxy.

The interest in producing the deposit of the thin film by liquid phase epitaxy is a result of the fact that said deposition procedure permits considerable flexibility regarding the performing of the different doping and codoping operations with a view to adaptation to different lasers. It also makes it possible to obtain a higher concentration, if necessary, than other crystal growth methods, so that it is possible to use very thin films (~100 um) and thus use highly focussed beams. In addition, the damage threshold is higher, because the thus produced material is of crystalline quality.

This method also offers the possibility of very precisely controlling the thickness and concentration of the thin film, as a function of the laser type. Once again the saturable absorber produced only gives rise to very small intracavity losses due to the good optical quality of the films and the limited thickness necessary (<500 μm).

According to a preferred embodiment of the invention, the saturable absorber can be directly deposited on the active, solid medium.

Preferably, the refractive index of the saturable absorber film is adapted to the refractive index of the solid, active medium.

The thin film can be formed from a base material having a crystal structure identical or close to that of the active, solid medium, said base material being doped with erbium, chromium, thulium or holmium ions.

The invention also offers the possibility of producing a laser cavity with a waveguide structure.

According to a first embodiment of said waveguide, a saturable absorber film is placed between two active laser material films.

According to a second embodiment of said waveguide, the active medium and the saturable absorber constitute a single film.

In all of cases, all the films can be obtained by liquid phase epitaxy.

Apart from a laser cavity as described hereinbefore, a laser according to the invention has cavity pumping means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1A:
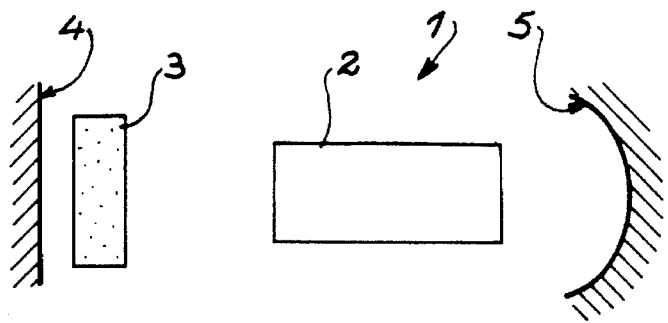
FIGS. 1a to 1d, already described, diagrammatically illustrate various possible arrangements of a prior art laser cavity.
Figure 1B:
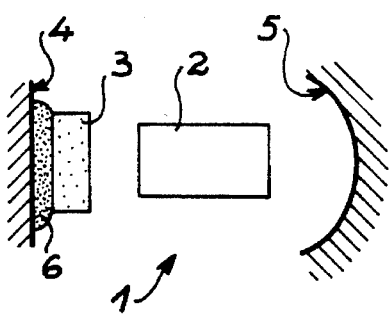
Figure 1C:
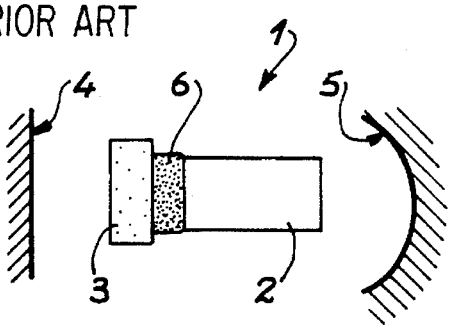
Figure 1D:
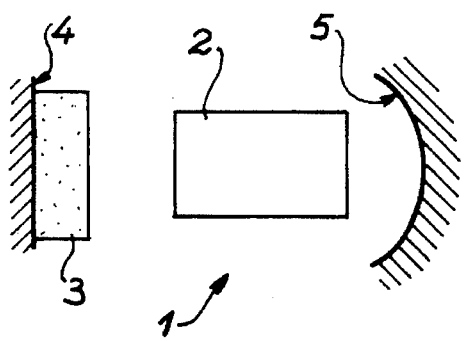
Figure 2:
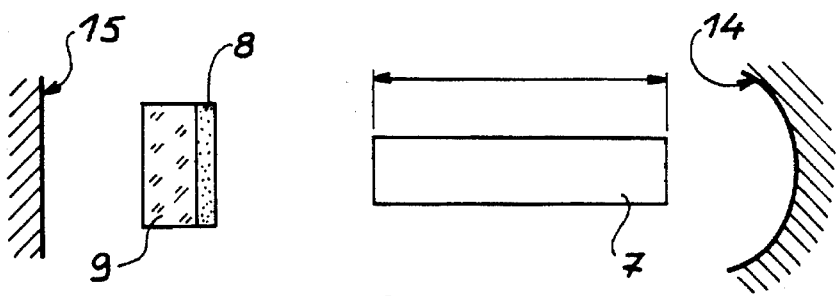
FIG. 2 shows a laser cavity according to a first embodiment of the invention.

According to a first embodiment of the invention illustrated in FIG. 2, the laser cavity comprises an active laser medium (solid) 7, a thin saturable absorber film 8 deposited on a substrate 9, everything being located between an entrance mirror 14 and an exit mirror 15.

In a conventional manner, the constituent material of the active medium 7 can be doped with neodymium (Nd) for a laser emission around 1.06 μm. This material can e.g. be chosen from among: YAG ($Y_3Al_5O_{12}$), LMA ($LaMgAl_{11}O_{19}$), $YVO_4$, YSO($Y_2SiO_5$), YLF ($YLiF_4$), $GdVO_4$, $Ca_2Al_2SiO_7$, $Ca_5(PO_4)_3F$. This choice will be conditioned by the following criteria, but will also be a function of the applications:

1. as will be shown hereinafter, the laser cavity is optically pumped, preferably with one or more laser diodes. Thus, a first criterion is a high absorption coefficient at the wavelength of the pump (e.g. III-V laser diode emitting at around 800 nm) in order to increase the pumping efficiency, while maintaining a limited material thickness (<1 mm).

2. a wide absorption band at the wavelength of the pump, e.g. at about 800 nm, in order to deal with the problem of laser diode wavelength stabilization, thus simplifying the choice and electrical control of the pumping laser diode.

3. a large effective, stimulated emission cross-section to obtain high, high efficiency output powers.

4. a limited emission band width for easily obtaining a monofrequency laser, or conversely a wide emission band for obtaining a frequency-tuneable laser emission.

5. good thermomechanical properties for simplifying the machining of the material and for limiting thermal effects prejudicial to a good dissipation of the heat produced by the absorption of the pump (said excess heat depending on the energy efficiency of the laser).

6. a long service life for a high energy storage, or a short life for a rapid switching rate.

In general, none of the known materials simultaneously meets all these criteria. However, among the known materials, those most suitable for the operation of the laser are (with comparable life periods of a few hundred microseconds):

$YVO_4$, which has a good coefficient and wide absorption band, as well as a good effective cross-section, but a poor thermal conductivity;

YAG, which has an average stimulated emission effective cross-section and absorption coefficient and narrow absorption and emission bands, but a good thermal conductivity and doped with neodymium (Nd). It is the best known and at present most widely used solid laser material;

LMA, which offers low absorption coefficient and effective cross-section, the absorption and emission bands are wide and its thermal conductivity is not very good.

The active ions for doping the material constituting the laser medium can be chosen from among:

neodymium (Nd) for an emission around 1.06 μm, erbium (Er) or ytterbium (Yb) for an emission around 1.5 μm, thulium (Tm) for an emission around 2 μm.

In preferred manner, the thin film is obtained by liquid phase epitaxy (LPE) or in more general terms by a process making it possible to obtain a film having the same characteristics as one obtained by LPE (e.g. vapor phase deposition process), the film then being obtainable by LPE.

The LPE process is described in greater detail hereinafter and makes it possible to obtain, on the substrate, a 1 to 500

μm thick film. It is constituted by a base material identical to that of the substrate (e.g. YAG on YAG), or having a crystal structure (lattice) identical to or close to that of the material constituting the substrate. This base material is doped with ions giving it saturable absorber properties, e.g. $Cr^{4+}$ for a laser emitting at 1.06 μm or $Er^{3+}$ for a laser emitting at about 1.5 μm. Thulium (Tm) or holmium (Ho) are other possible dopants.

Thus, the type of dopant is adapted to the laser which it is wished to switch, so that the epitaxied film has a saturable absorption at the emission wavelength of said laser. Thus, it has been found that the following pairs (active laser ions, ion for saturable absorber) are suitable:

| Active laser ion | Nd | Er | Tm | Yb | Tm |
|---|---|---|---|---|---|
| SA ion | Cr | Er | Tm | Cr | Ho |

Using the example of the device illustrated by FIG. 2, the saturable absorber film 8 is produced on a substrate 9, which is non-active at the wavelength of the laser. For example, it would be possible to choose a neodymium doped YAG bar for the active laser material 7, an undoped YAG substrate 9 and a saturable absorber film 8 constituted by $Cr^{4+}$-doped YAG. The assembly (8–9) is merely inserted in the cavity in place of the conventionally used solid saturable absorber.

Among the advantages provided here by the present invention, reference can be made to the reliability of the material (life equivalent to that of the laser material) and good resistance to fluxes making it possible to better focus the beam in the saturable absorber and thus lower the energy necessary for the saturation of the SA. In addition, it is possible to deposit the SA film on substrates having different shapes and sizes. Finally, the limited SA thickness necessary (typically between 1 and 500 μm) makes it possible to considerably reduce the residual losses induced in the cavity by the presence of the saturable absorber. According to another embodiment of the invention, it is possible to deposit the saturable absorber film directly on the active laser material and in this case the latter serves as and replaces the substrate.

As a function of the type of application of the laser cavity structure, several devices can be envisaged. The two simplest relate to the use as an active substrate of either a conventional laser bar, or a microlaser constituted by a monocrystalline lamina. In these different configurations, the refractive index of the thin saturable absorber film is preferably adapted to the refractive index of the solid, active medium 7. The present invention makes it possible to meet this requirement by appropriate codoping operations of the SA film.

Figure 3:
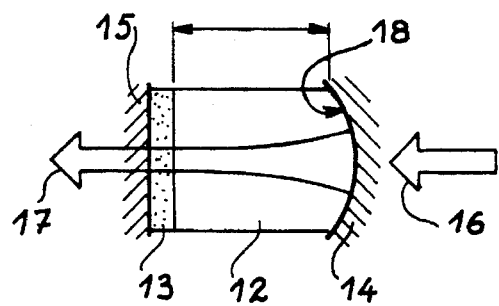
FIG. 3 shows a laser cavity according to a second embodiment of the invention.

The case of deposition on a conventional laser bar is illustrated in FIG. 3, which shows a SA film 13, a laser bar 12, entrance mirror 14 and exit mirror 15, a pumping beam 16 and the emitted laser beam 17. The SA film 13 is deposited directly on the polished face of the bar 12 by surface immersion of the epitaxy bath (cf. the preparation process described hereinafter). So as to make the structure more compact, the exit mirror 15 can be deposited directly on the thin film 13.

It is possible to consider polishing the other bar face 18 with a finished, appropriate radius of curvature and then depositing thereon the cavity entrance mirror 14, thus making it monolithic, as shown in FIG. 3. The bar length and diameter, as well as the SA film thickness and doping are to be adapted to the pumping type used which, in this case, can be of widely varying type, pulsed or continuous, lamp pumping, continuous or pulsed, longitudinal or transverse, diode pumping.

The advantage of this arrangement is that the assembly constituted by the bar 12 and the SA 13 behaves like a solid material.

The adaptation of the index of the SA film to that of the laser material can take place by codoping the film 13 with gadolinium (Ga) and lutetium (Lu). Gadolinium serves to adapt the index, but it widens the lattice of the crystal system, which can be compensated by lutetium codoping. With this type of laser cavity, no loss due to a poor alignment or Fresnel reflections is introduced into the cavity.

Figure 4:
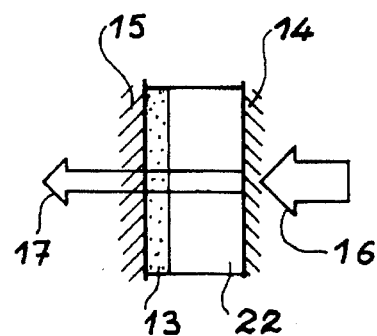
FIG. 4 illustrates a microlaser cavity according to a third embodiment of the invention.

In the case of deposition on a microlaser medium (cf. FIG. 4), a SA film 13 (optionally with a codoping as explained hereinbefore) is epitaxied on one face of the active microlaser medium 22 used as the substrate (thickness 0.1–2 mm). Reference numbers 16 and 17 have the same meaning as in FIG. 5.

The collective manufacture of such lasers is then virtually identical to that of continuous microlasers due to the SA production procedure, which does not modify the monocrystalline structure of the assembly. The two cavity mirrors 14 and 15 are then deposited on the previously polished faces of the substrate/film structure, which is then cut into parallelepipeds of approximately $1\times1$ mm², thus producing a large number of switched microlasers.

Preferably and according to all the embodiments of the invention, the mirrors are dichroic mirrors.

According to a fourth embodiment of the invention, the laser is produced with a waveguide structure.

The procedure consists of stacking several differently doped epitaxied films on an undoped substrate in order to produce a switched laser waveguide. The thus obtained film stack is cut into parallelepipeds of length adapted to the pumping and laser type to be produced. Two lateral faces are then polished in parallel and mirrors are deposited there, everything forming a monolithic laser cavity, which can be pumped transversely or longitudinally according to the particular case.

Figure 5:
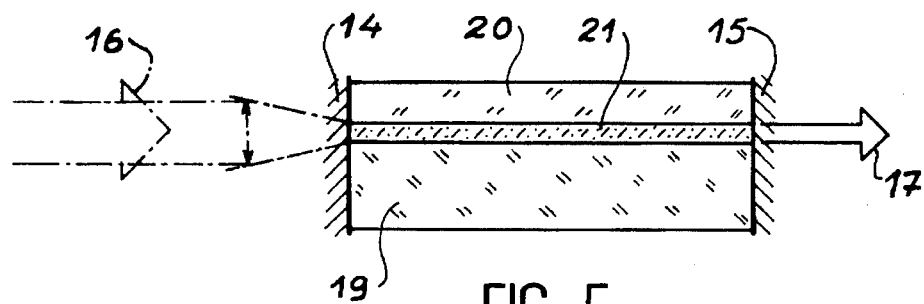
FIG. 5 sets forth a laser cavity according to a fourth embodiment of the invention having a waveguide structure.

Thus, as illustrated in FIG. 5, it is possible to produce on a substrate 19, e.g. of undoped YAG (it would also be possible to use other materials e.g. chosen from among: LMA ($LaMgAl_{11}O_{19}$), $YVO_4$, YSO ($Y_2SiO_5$), YLF ($YLiF_4$), $GdVO_4$, $Ca_2Al_2SiO_7$, $Ca_5(PO_4)_3F$), a film 21 serving both as the amplifier medium (active laser medium) and the saturable absorber. For this purpose, the thin film 21 will be doped with two types of ions, the first type giving it active laser medium properties and the second giving it saturable absorber properties. Reference number 20 represents a protective coating of the same nature as the substrate 19 and deposited on the thin film, so that the latter is located between two non-guiding, protective coatings (19,20). Reference numbers 16 and 17 respectively represent the pumping beam (by diode) and the emitted laser beam. Using YAG as an example, the film 21 is an epitaxied YAG film e.g. doped by neodymium (ions ensuring the amplifier medium properties) and codoped with chromium ions ($Cr^{4+}$). It is possible to add Ga and Lu ions, which will have index adaptation and crystal structure compensating functions as described hereinbefore.

The thickness, index and concentrations of Nd ions (or Yb, Er or Tm ions) and Cr ions (or Er, Tm or Ho ions) are adapted to the type of pumping with which it is wished to be used, namely transverse or longitudinal, as well as to the type of lasers which is wished to be produced, namely monomode or multimode.

Figure 6:
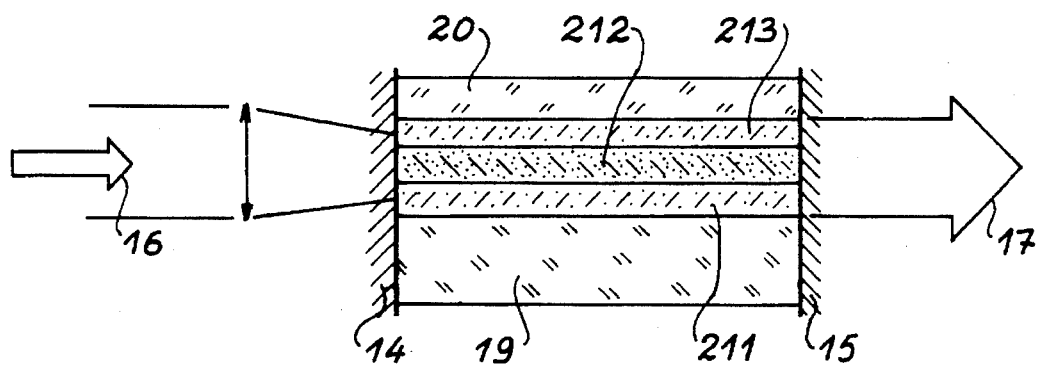
FIG. 6 shows a laser cavity according to a fifth embodiment of the invention also having a waveguide structure.

FIG. 6 illustrates another waveguide example according to the invention, where reference numbers 14,15,16 and 17 have the same meaning, respectively as in FIG. 5.

Epitaxy takes place on an undoped YAG substrate 9 of an active laser material film 211 (e.g. weakly Er doped YAG), followed by the epitaxy of a saturable absorber film 212 (e.g. strongly doped Er YAG) and then again the epitaxy of an active laser material film 213 (e.g. weakly Er doped YAG) and finally the deposition of an undoped YAG film 20. Thus, the films are located between two non-guiding, protective coatings or films 19,20. The three epitaxied coatings are codoped Ga, Lu in order to create an index gradient optimizing the guidance in the active films (weakly Er doped) and SA film (highly Er concentrated).

Materials other than YAG can replace the latter (cf. the aforementioned list) and other dopings can be used as a function of the sought wavelength for the laser emission (Nd, Yb, Tm).

A laser according to the invention incorporates a cavity like that described hereinbefore, as well as the pumping means thereof. Preferably, these pumping means consist of at least one lamp or diode, which pumps the cavity in a longitudinal direction (as in FIGS. 3, 4, 5 and 6) or in a transverse direction (perpendicular to the plane of the drawings).

The process for the production of such a laser cavity will now be described.

The SA material is a doped, monocrystalline film, epitaxied on a solid, monocrystalline material (substrate) having the same crystal structure. The method used is liquid phase epitaxy (LPE). The type of crystal and the dopant are adapted to the laser which it is wished to switch, so that the epitaxied film has a saturable absorption at the emission wavelength of said laser. Epitaxy is a crystal growth method giving access to higher dopant concentrations than conventional solid crystal growth methods. Compared with said other methods it also leads to the advantage of permitting an easier production of the crystal coatings codoped by different ions. Moreover, LPE is the only epitaxy method making it possible to obtain layers or films of significant thickness (>100 μm).

The type of laser to be produced determines the material used for the substrate on which is deposited the film, as well as the doping ion of the film. The type of operation of said laser determines whether the substrate must be constituted or not by an active laser material, together with its shape and its dimensions.

At least one face of the substrate is oriented and polished. The final polishing stage must be a mecano chemical process, so that said face is free from any defects (inclusions, dislocations, strains, scratches, etc.), which would propagate in the thickness of the film during epitaxy. This polishing quality is controlled by an appropriate chemical etching. The process to be performed is substantially identical to that used for substrates employed in conventional epitaxy methods.

For certain types of operation (e.g. waveguide laser), the substrate can have two parallel faces with said polishing quality. Hereinafter reference will be made to a substrate with one polished face or two polished faces.

The saturable absorber or SA film is produced by immersing the substrate in an appropriately chosen, supersaturated solution. This solution or epitaxy bath is a mixture of a solvent and a solute constituted by different elements forming the final material. The substrate and the film have the same crystal structure and only differ by the dopants, which affect the crystalline and optical properties of the film. The active ions such as Nd, Er and Yb make the material amplifying, whereas other ions (Cr, Er) give it SA properties and certain others can be used for varying the refractive index or crystal lattice of the material (e.g. Ga, Ge, Lu, etc.).

It is thus possible to control the properties of the films produced and deposit by said procedure not only thin SA films, but also films of active laser material, such as when producing a laser having a waveguide structure, as described hereinbefore (FIG. 6).

This process is applicable to any material in the form of monocrystals (for producing substrates) and which can be prepared by liquid phase epitaxy. This is the case with the aforementioned materials for the base material of the active laser medium: $Y_3Al_5O_{12}$ (YAG), $Y_2SiO_5$ (YSO), $YVO_4$, $YLiF_4$ (YLF), $GdVO_4$, etc. The composition of the bath (choice of solvent and substituents), the concentrations in the solute of the different oxides and the experimental growth conditions (temperature range, operating procedure, etc.) are adjusted for each material in order to obtain films having the optimum crystalline quality.

In the case of garnets (YAG), the chosen solvent is a $PbO/B_2O_3$ mixture and the solute consists of a $Al_2O_3$ excess in order to stabilize the garnet phase. The solute/solvent ratio is then calculated so as to obtain a growth at about 1000° C.

As a function of the composition of the bath, the temperature and time of deposition, it is possible to adjust the thickness e of the film ($1<e<200$ μm) and the dopant concentration in the films. The growth of a film takes place at constant temperature, which makes it possible to obtain a homogeneous dopant concentration in the film thickness. The substrate performs an alternating or uniform rotary movement, which leads to a good thickness uniformity. Substrates having one polished face are immersed on the surface of the bath, whereas substrates having two polished faces are immersed within said bath.

When required by the application (e.g. waveguide laser), it is possible to carry out successive epitaxies of differently doped materials, thus creating a stack of films of the same crystal structure, but different optical properties.

In certain cases, when the surface state of the film (very thick films) makes it necessary, a mecano chemical polishing can be carried out, either between two successive epitaxies, or at the end of the process on the final SA surface (e.g. prior to the deposition of reflecting or anti-reflecting, dielectric coatings).

The final stage of the process consists of conditioning the film/films-substrate assembly as a function of the desired application. When the substrate is active, the cutting, polishing and dielectric deposition processes are the same as the known processes used for conditioning the active material without SA. Thus, the material produced within the scope of the invention is monolithic and of the same crystal structure.

The invention is applicable to the manufacture of lasers. It has in particular an application in the field of microlasers used in integrated optics, in optical fiber telecommunications and in medicine (microsurgery). In such applications, the space gain permitted by the invention is very advantageous. The actual production process only requires the use of a conventional procedure (LPE).

We claim:

1. A laser cavity, which comprises:
   a solid, active laser medium, a saturable absorber, an entrance mirror and an exit mirror, wherein the saturable absorber comprises a thin saturable absorber material film deposited directly on the solid, active medium.

2. Laser cavity according to claim 1, wherein the thin film is obtained by liquid phase epitaxy.

3. Laser cavity according to claims 1 or 2, wherein the refractive index of the saturable absorber film is adapted to the refractive index of the solid, active medium.

4. Laser cavity according to claim 3, wherein the thin film is formed from a base material having an identical or similar crystal structure to that of the solid, active medium and wherein said base material is doped with one of erbium, chromium, thulium and holmium ions.

5. Laser cavity according to claims 1 or 2, wherein the cavity exit mirror is directly deposited on the saturable absorber film.

6. Laser cavity according to claim 5, wherein the entrance mirror is directly deposited on the solid, active medium.

7. Laser cavity according to either of claims 1 or 2, wherein the cavity includes a waveguide structure.

8. Laser cavity according to claim 7, wherein the active laser material comprises a first film.

9. Laser cavity according to claim 8, wherein the saturable absorber film is located between the first active laser medium film and a second active laser medium film.

10. Laser cavity according to claim 9, wherein the two active laser medium films are deposited by liquid phase epitaxy.

11. Laser cavity according to claim 9, wherein the three thin films have an index gradient so as to optimize guidance.

12. Laser cavity according to claim 11, wherein the saturable absorber film is formed from a base material having an identical or similar crystal structure to that of the solid, active medium, and wherein said base material is doped with ions selected from the group consisting of erbium, chromium, thulium or holmium ions.

13. A laser incorporating a laser cavity according to one of claims 1 or 2 and including cavity pumping means.

14. A laser incorporating a laser cavity according to one of claims 1 or 2 and including a cavity pump.

15. Laser cavity incorporating a solid, active laser medium, a saturable absorber, an entrance mirror and an exit mirror, wherein the saturable absorber comprises a thin saturable absorber material film, the cavity having a waveguide structure and wherein the active medium and saturable absorber comprise a single film.

16. Laser cavity according to claim 15, wherein the film is obtained by liquid phase epitaxy.

17. Laser cavity according to claim 16, wherein the single film comprises a base material, doped with a first and second type of ions, the first ion type providing active laser medium properties and the second type providing saturable absorber properties.

18. Laser cavity according to claim 17, wherein the index of the film is adapted by Ga doping.

\* \* \* \* \*